(12) United States Patent
McCarthy et al.

(10) Patent No.: US 10,976,935 B1
(45) Date of Patent: Apr. 13, 2021

(54) METHOD AND APPARATUS FOR ASSIGNING AN ALLOCATED WORKLOAD IN A DATA CENTER HAVING MULTIPLE STORAGE SYSTEMS

(71) Applicant: EMC IP HOLDING COMPANY LLC, Hopkinton, MA (US)

(72) Inventors: Jason McCarthy, Cambridge, MA (US); Girish Warrier, Natick, MA (US); Rongnong Zhou, South Grafton, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/787,075

(22) Filed: Feb. 11, 2020

(51) Int. Cl.
*G06F 3/06* (2006.01)
*G06F 11/34* (2006.01)

(52) U.S. Cl.
CPC .......... *G06F 3/0614* (2013.01); *G06F 3/061* (2013.01); *G06F 3/067* (2013.01); *G06F 3/0631* (2013.01); *G06F 11/3414* (2013.01)

(58) Field of Classification Search
CPC .................................................. G06F 3/0614
USPC ........................................................ 711/154
See application file for complete search history.

(56) References Cited

U.S. PATENT DOCUMENTS

| 6,223,258 | B1 * | 4/2001 | Palanca ............... | G06F 9/3824 |
| | | | | 711/138 |
| 7,809,915 | B2 * | 10/2010 | Korupolu ............ | G06F 3/0631 |
| | | | | 711/170 |
| 8,862,280 | B1 * | 10/2014 | Dyess .................. | F24F 11/30 |
| | | | | 700/291 |

* cited by examiner

*Primary Examiner* — Jae U Yu
(74) *Attorney, Agent, or Firm* — Anderson Gorecki LLP

(57) ABSTRACT

A method and apparatus for assigning an allocated workload in a data center having multiple storage systems includes selecting one or more storage systems to be assigned the allocated workload based on a combination of performance impact scores and deployment scores. By considering both performance impact and deployment effort, the allocated workload is able to be assigned with a view not only toward storage system performance, but also with a view toward how deployment on a particular storage system would comply with data center policies and the amount of configuration effort it would take to enable the workload to be implemented on the target storage system. This enables workloads to be allocated within the data center while minimizing the required amount of configuration or reconfiguration required to implement the workload allocation within the data center.

20 Claims, 4 Drawing Sheets

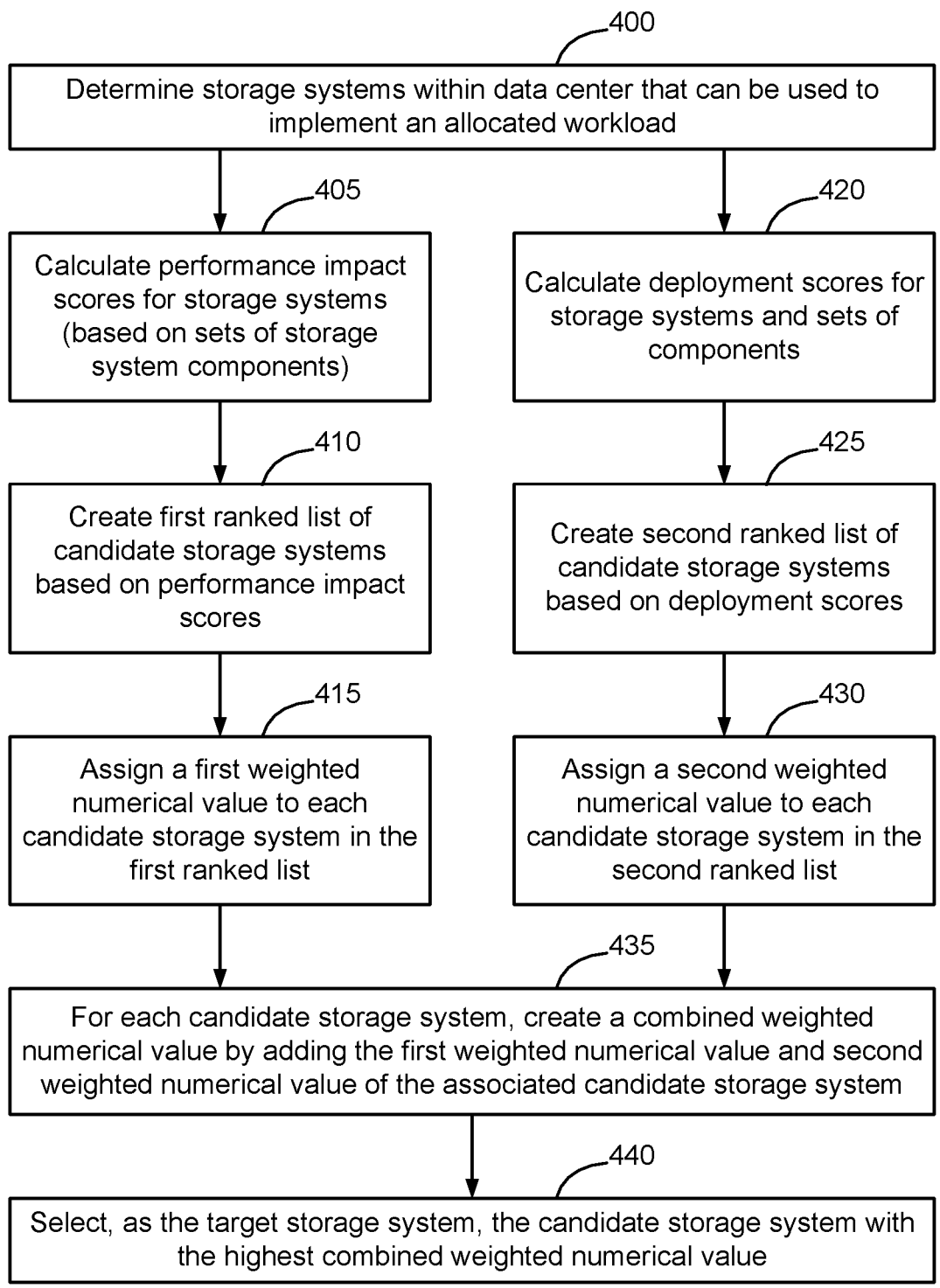

… (1)

METHOD AND APPARATUS FOR ASSIGNING AN ALLOCATED WORKLOAD IN A DATA CENTER HAVING MULTIPLE STORAGE SYSTEMS

FIELD

This disclosure relates to computing systems and related devices and methods, and, more particularly, to a method and apparatus for assigning an allocated workload in a data center having multiple storage systems.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a method and apparatus for assigning an allocated workload in a data center having multiple storage systems includes selecting one or more storage systems to be assigned the allocated workload based on a combination of performance impact scores and deployment scores. By considering both performance impact and deployment, the allocated workload is able to be assigned with a view not only toward storage system performance, but also with a view toward how deployment on a particular storage system would comply with data center policies and the amount of configuration effort it would take to enable the workload to be implemented on the target storage system. This enables workloads to be allocated within the data center while minimizing the required amount of configuration or reconfiguration required to implement the workload allocation within the data center.

BRIEF DESCRIPTION OF THE DRAWINGS

FIG. 4 is a flow chart of an example process executed by the storage system manager in connection with assigning an allocated workload in a data center having multiple storage systems, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
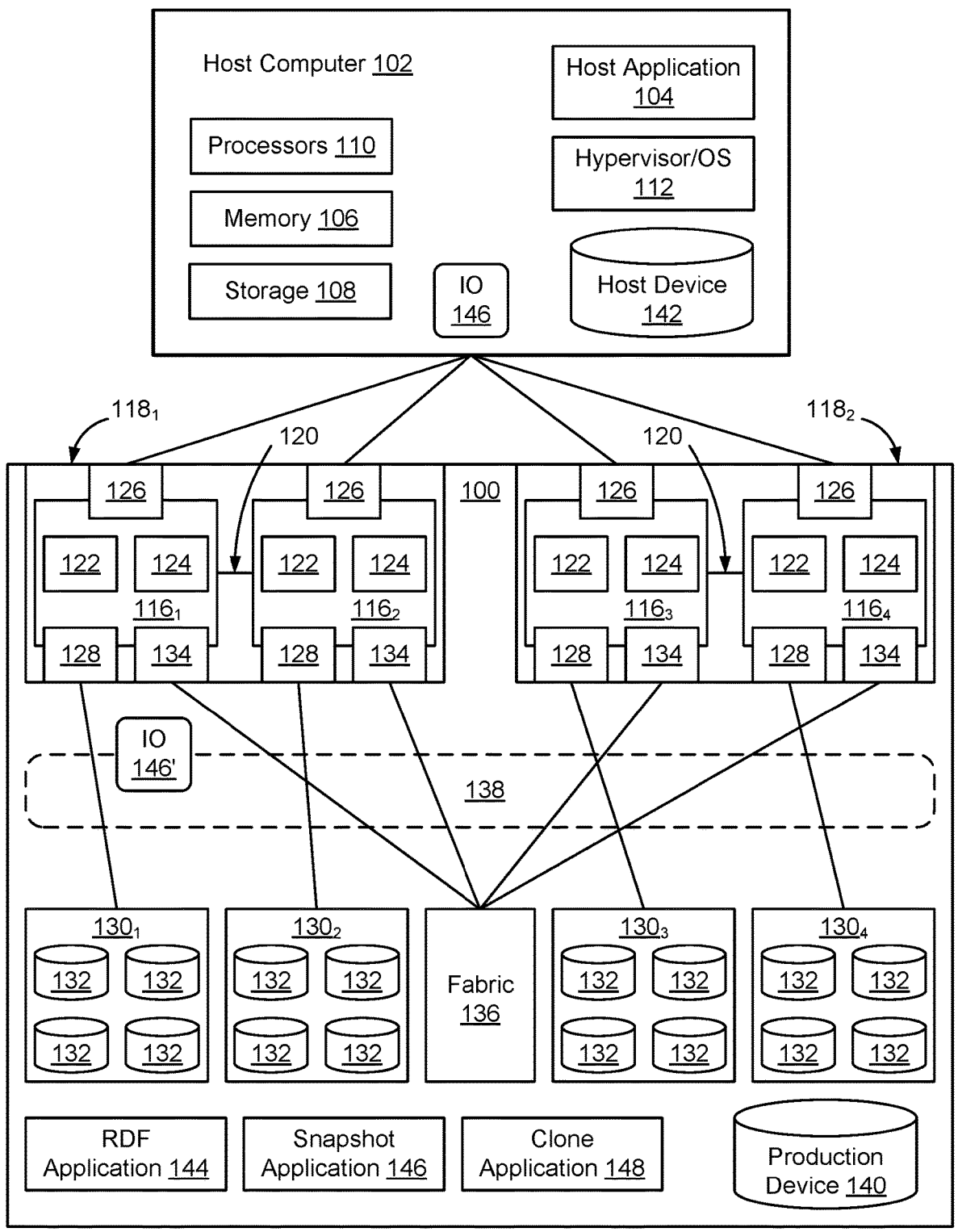
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (operating system) 112. The processors 110 may include one or more multi-core processors that include multiple CPUs, GPUs, and combinations thereof. The host volatile memory 106 may include RAM (Random Access Memory) of any type. The persistent storage 108 may include tangible persistent storage components of one or more technology types, for example and without limitation Solid State Drives (SSDs) and Hard Disk Drives (HDDs) of any type, including but not limited to SCM (Storage Class Memory), EFDs (enterprise flash drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented in a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back end adapters 128 for communicating with respective associated back end drive arrays $130_1$-$130_4$, thereby enabling access to managed drives 132.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using Non-Volatile Memory (NVM) media technologies, such as NAND-based flash, or higher-performing Storage Class Memory (SCM) media technologies such as 3D XPoint and Resistive RAM (ReRAM). Managed drives 132 may be directly connected to the compute nodes $116_1$-$116_4$, using a PCIe bus or may be connected to the compute nodes $116_1$-$116_4$, for example, by an InfiniBand (IB) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via Direct Memory Access (DMA) or Remote Direct Memory Access (RDMA).

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (logical block addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application 104 data in the virtual shared global memory 138 and the managed drives 132. In response to an IO (input/output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

There may be multiple paths between the host computer 102 and the storage system 100, e.g. one path per front end adapter 126. The paths may be selected based on a wide variety of techniques and algorithms including, for context and without limitation, performance and load balancing. In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 via one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132. The virtual shared global memory 138 may enable the production device 140 to be reachable via all of the compute nodes $116_1$-$116_4$ and paths, although the storage system 100 can be configured to limit use of certain paths to certain production devices 140 (zoning).

Figure 2:
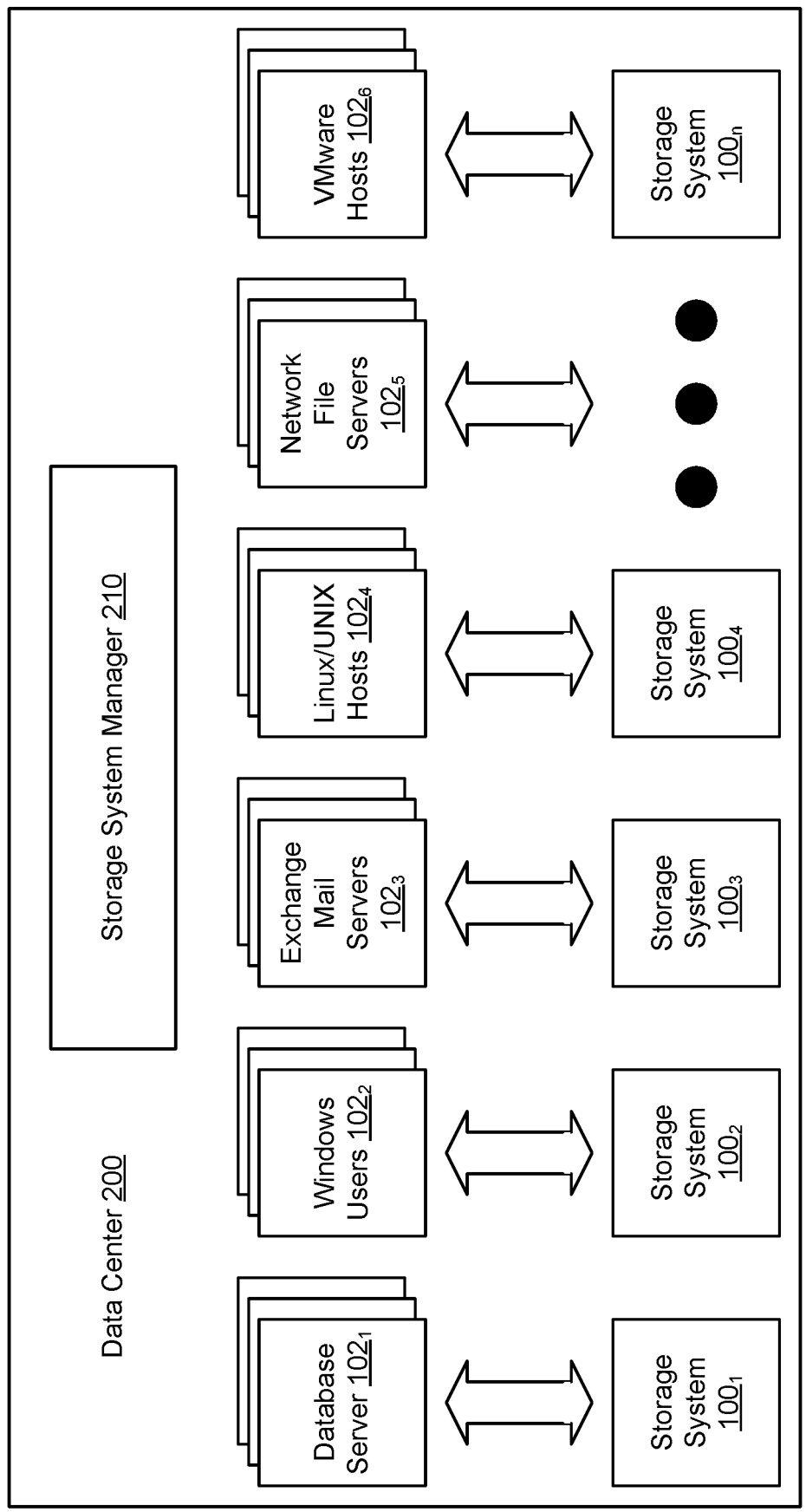
FIG. 2 is a functional block diagram of an example data center having multiple storage systems and a storage system manager, according to some embodiments.

FIG. 2 is a functional block diagram of an example data center 200 having multiple storage systems 100 and a storage system manager 210, according to some embodiments. As shown in FIG. 2, a data center 200 may have numerous storage systems 100, labeled $100_1$-$100_n$ in FIG. 2. Hosts 102, such as database servers $102_1$, windows users $102_2$, exchange mail servers $102_3$, Linux/UNIX hosts $102_4$, network file servers $102_5$, and VMware hosts $102_6$, are assigned to execute on particular storage systems 100 of the data center 200. Once a host 102 is assigned to a particular storage system 100 or to a set of particular storage systems 100, the host 102 will interact with the assigned storage system(s) 100 in connection with storage of its data in the data center 200.

Storage system manager 210 assigns the hosts 102 to the storage systems 100, and generally is used to control operation of the storage systems 100 within data center 200. The storage system manager 210 may execute on a computer, such as a laptop computer, that is connected to the data center directly or remotely over a network such as the Internet. Alternatively, the storage system manager 210 may execute on one of the host computers 102 connected to or implemented within one of the storage systems 100.

When a new host 102 is added to the data center 200, or if the workload associated with one or more of the hosts 102 is required to be moved within the data center 200, the storage system manager 210 will select one or more of the storage systems 100 to handle the workload and assign the allocated workload to one or more of the storage systems 100. As used herein, the term "allocated workload" will be used generically to refer to both an existing workload that is migrated from a first storage system to a second storage within the data center 200, and to a new workload from a host 102 that is to be assigned to a storage system in the data center 200.

There are many reasons for an existing workload to be migrated within the data center 200. For example, the workload on one of the storage systems may increase to the point where the storage system 100 that is currently handling the workload is unable to meet Service Level Agreement (SLA) response times associated with the workload. Similarly, the workload may need to be moved to enable one or more of the storage systems to be powered down. There many reasons that the workload of a given host 102 may need to be moved from a first storage system to a second storage system within the data center 200, and these are only a few such examples.

Likewise, there are many reasons that a new workload may need to be added to the data center. For example, a new host 102 may connect to the data center 200 and the expected workload of the new host 102 will need to be assigned to one or more of the storage systems 100. Likewise, an existing host 102 may have a new application 104 that will need to access the storage resources of one or more of the storage systems 100 of the data center 200.

Whenever a workload is to be migrated within the data center or added to the data center, the storage system manager 210 is required to select a storage system 100 or set of storage systems 100 to be used to provide storage resources for the allocated workload.

According to some embodiments, a system and method are provided to enable the storage system manager 210 to identify and recommend the optimal target storage system 100 when provisioning a new workload to the data center 200, and when migrating an existing workload within data center 200. In some embodiments, storage system manager 210 selects one or more of the storage systems 100 to be assigned the allocated workload based on a combination of performance impact scores and deployment scores. By considering both performance impact and deployment, the allocated workload is able to be assigned with a view not only toward system performance, but also with a view toward how deployment on a particular storage system would comply with data center policies and the amount of configuration effort it would take to enable the workload to be implemented on the target storage system. This enables workloads to be allocated within the data center 200 while minimizing the required amount of configuration or reconfiguration required to implement the workload allocation within the data center 200.

FIG. 4 is a flow chart of an example process executed by the storage system manager 210 in connection with assigning an allocated workload in a data center having multiple storage systems, according to some embodiments. As shown in FIG. 4, in some embodiments the storage system manager 210 determines which storage systems within the data center 200 can be used to implement an allocated workload (block 400). The selection at block 400 may be implemented in multiple ways. For example, the storage system manager 210 may consider all storage systems, may eliminate particular storage systems from consideration that are currently oversubscribed, or may otherwise narrow down the list of possible storage systems 100 by identifying particular storage systems that are not likely to be suitable candidate storage systems for a particular workload that is to be allocated.

Once a set of candidate storage systems is determined, the storage system manager 210 calculates performance impact scores for each of the candidate storage systems (block 405). In some embodiments, as discussed below, the performance impact on a storage system is determined by looking at the performance impact on individual components within the storage system to determine the overall performance impact on the storage system.

To determine the performance impact the allocated workload will have on a storage system, in some embodiments, the workload that is to be allocated is characterized. Once the workload is characterized, a simulation is performed to simulate adding the workload to sets of storage system components of each of the candidate storage systems.

There are several ways to characterize the workload. For example, if the workload is currently being handled by one or more of the storage systems of the data center 200, and is to be migrated within the data center 200, the workload may be monitored by the storage system manager 210 for a period of time to determine how the existing workload changes over time. For example, a subset of metrics such as number of IO operations may be used to characterize the workload to be migrated, and the storage system manager 210 may monitor those features of the workload for a selected monitoring period, such as for two weeks. Other features may be monitored and the number of IO operations is used merely as an example. Likewise, other monitoring periods may be used as well. In some embodiments, the telemetry data of the workload is condensed or aggregated by the storage system manager 210 to minimize the amount of data required but to maintain a representative shape of how the workload changes over time.

If the workload is a new workload, it may be characterized with reference to other similar workloads. For example, if the storage system manager is provided with the type of workload and anticipated volume, the storage system manager may simulate the workload by monitoring existing workloads of similar hosts on the storage systems 100 of the data center 200. Alternatively, the new workload may be simulated using assumed workload parameters, such service level, workload type, and expected capacity.

In some embodiments, once the allocated workload is characterized, the storage system manager 210 calculates an impact score for each storage system that may be used to assume responsibility for the allocated workload (block 405). In some embodiments, the impact scores are based not only on the overall impact to the storage system 100, but also by considering the impact addition of the workload would have on individual components of the storage system.

Assigning an allocated workload within the data center will affect multiple aspects of the storage system(s) selected to implement the allocated workload. Example components that will be affected include the front-end adapters 126, the back-end adapters 128, the cache 124, and processor resources 222 of the directors 116, in addition to affecting the drive array(s) 130 that are used to store data and perform IO operations associated with the workload.

In some embodiments, the storage system manager 210 is configured to perform workload testing to determine the impact of the additional workload on each of these components to create a performance impact score for a storage system (FIG. 4, block 405). Workload testing may be implemented, in some embodiments, by using the current workload and utilization of that component, simulating the distribution and application of the allocated workload to that component, and determining how the allocated workload will affect the component. In some embodiments, the resultant usage/performance level for the component is compared with a best practice limit/threshold for that component. The overall "score" for each component grouping (front end, back end, cache) takes the scores of each of the underlying components and reports the most performance limited value. For example, the front-end score takes the ports and directors in the generated/specified port group and reports the port or director that is closest to hitting its best practice performance threshold. Other ways of implementing performance testing may be utilized as well depending on the implementation.

In addition to evaluating overall performance impact, in some embodiments calculating a performance impact scores (block 405) includes mapping the allocated workload to the appropriate service level on each target storage system. A given storage system may have multiple service levels, with different response times. For example, a given storage system 100 may have three service levels, with different average expected response times, as well as maximum high and low response times. These values are different on different storage systems 100.

Further, a given storage system may have only limited resources to implement the highest service levels, and more resources available to implement the lower service levels. If the workload needs to be mapped into the highest service level of a first storage system, and would be mapped into a lower service level of a second storage system, the performance impact of the allocated workload is likely to be much higher on the first storage system than it would be on the second storage system. Accordingly, in some embodiments, calculating performance impact scores (block 405) includes mapping the allocated workload to a target storage tier on each target storage system and using the mappings in connection with calculating the performance impact scores.

There are multiple parameters that may be considered in connection with mapping an allocated workload to a target performance tier of a storage system. In some embodiments, a specified response time target of the allocated workload is considered and used to map the allocated workload to an appropriate service level on a given storage system that will enable that storage system to achieve the specified response time target.

Response time bands for service levels of a given storage system generally overlap with each other. For example, two service levels (Diamond and Platinum) of a given storage system might be configured such that the maximum acceptable response time for the Diamond service level is greater than the maximum expected response time of the Platinum service level. Because of this overlap, in some embodiments a service level is selected for the allocated workload from a set of service levels on the storage system, using a service level demarcation biased toward promotion.

In some embodiments, the following process is used to select a service level for an allocated workload from a set of service levels (A, B) on a storage system 100:

A_RT=average response time of the better service level;
B_RT=average response time of the worse service level; and
R_RT=target response time of allocated workload
DistanceAB=B_RT-A_RT (distance between the service levels=the average response time of the worse service level minus the average response time of the better service level).
Demarcation=(DistanceAB*0.7)+B_RT (service level demarcation that is used to select the service level for the allocated workload equals the average response time of the worse service level plus 70% of the difference between the service levels).
If: R_RT>Demarcation→use better service level. Otherwise, use worse service level. (If the target response time of the allocated workload is greater than the average response time of the worse service level plus 70% of the difference between the service levels, use the better service level. Otherwise, use the worse service level).

As shown in FIG. 4, once the storage system impact scores are created (block 405), a first ranked list of candidate storage systems is created based on the performance impact scores (block 410). In some embodiments, storage systems with the lowest impact score are ranked highest to preferentially have the allocated workload assigned to a storage system where the workload will have the least impact. In some embodiments, the candidate storage systems are initially ranked based on performance impact, and then the service level assignment is considered to adjust the ranked list to preferentially rank storage systems that are both able to handle the allocated workload from a performance standpoint and are able to have the allocated workload serviced using a lower service level. There are many ways to create the first ranked list of candidate storage systems.

In addition to performance impact scores, in some embodiments the storage system manager 210 calculates deployment scores (FIG. 4, block 420). Assigning an allocated workload requires a set of drive arrays 130 to be selected to store the allocated workload. Additionally, a set of directors 116 will need to be selected, and ports on the front-end adapters will need to be selected. To enable the host 102 to communicate with the storage systems, a set of initiators will need to be selected or created. Accordingly, the amount of work that will be required to be done to configure the storage systems of the data center to enable a selected storage system to handle the allocated workload may vary significantly. Likewise, although a particular storage system might have the capacity to handle the allocated workload, the available components on the storage system might make deployment on that particular storage system less desirable, for example due to a lack of redundancy.

Figure 3:
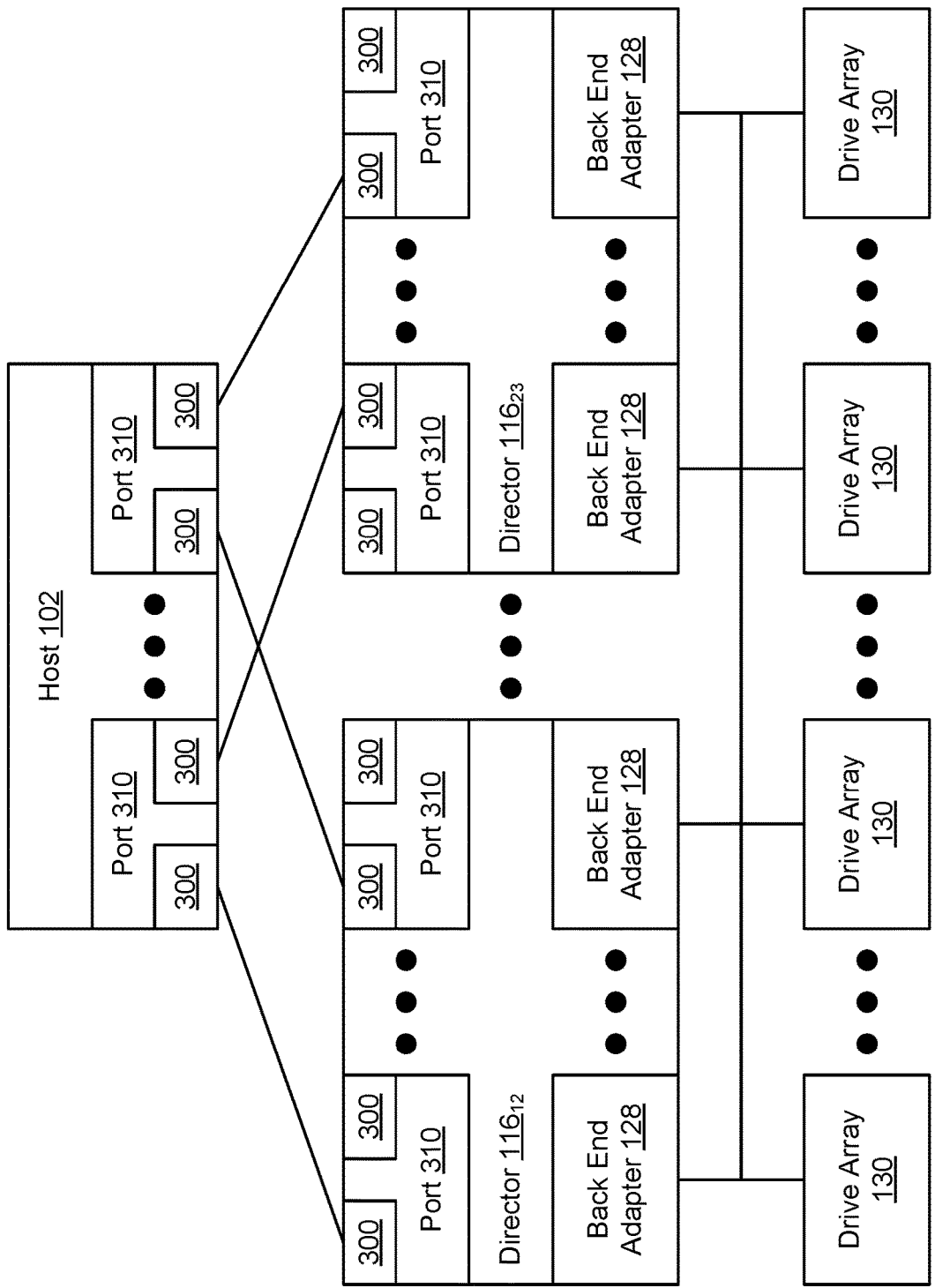
FIG. 3 is a functional block diagram of an example host connected to a set of directors of a storage system, according to some embodiments.

For example, as shown in FIG. 3, when a workload from a host 102 is assigned within a data center 200, the host 102 will need to connect to one or more of the directors 116. Preferably, as shown in the example of FIG. 3, the host would connect to multiple directors 116, such as directors 11612 and 11623, for redundancy. Although a particular storage system may rank high from a capacity standpoint (in block 410), when viewed from a policy standpoint the storage system may appear less suitable when the actual deployment on that storage system is viewed from a network policy standpoint. For example, a storage system that is only able to have the allocated workload assigned to a single director may be less desirable from a deployment standpoint than a storage system that is able to use redundant independent directors to handle the allocated workload. A deployment that included only one director, therefore, would reduce a lower deployment score than a deployment that had redundant directors.

Likewise, the characteristics of the port group that is available on the storage system will also affect the deployment score. Depending on the implementation, multiple policy rules might be used to preferentially select particular sets of ports.

In addition to port selection, to ensure the host 102 can access block storage resources, initiators 300 must be registered between the storage system 100 and configured host 102. Initiators 300 are endpoints from which Fibre Channel and iSCSI sessions originate, where each initiator is uniquely identified by its World-Wide Name (WWN) or iSCSI Qualified Name (IQN). The link between a host initiator and a target port on the storage system is called the initiator path. Each initiator can be associated with multiple initiator paths. To prevent an initiator from seeing all other initiators, zoning is used to mask sets of storage ports to present different sets of drives to different initiators.

In some embodiments, calculating a deployment score (FIG. 4, block 420) involves looking at the amount of effort that would be required to enable the allocated workload to be implemented on a selected set of components. Based on the deployment effort, and suitability of the sets of components, a second ranked list of candidate storage system is created based on the deployment scores (block 425).

In some embodiments, calculating deployment scores (block 420) and creating the second ranked list of candidate storage systems (block 425) involves calculating a zoning effect score, considering port selection policies, and initiator group generation.

Zoning scenarios are categorized and scored based on the amount of effort it will take to complete zoning in connection with deploying the allocated workload, and the amount of risk incurred by not resolving zoning issues. For example, if there is no zoning between any host initiators 300 in the initiator group or ports 310 in the port group, this is the worst-case scenario. If all initiators 300 have visibility to one or more ports 310 in the port group, and there is director 116 redundancy even though one port 310 is offline, this is less severe. If there are multiple ports 310 in a port group, but they are all on the same director 116, this is even less severe. If all ports 310 are online, the initiators 300 are logged in, there is port redundancy and director redundancy, there are no zoning issues—this is the best-case scenario. Accordingly, in some embodiments, in connection with calculating deployment scores (block 420), the storage system manager 210 creates a zoning score for each set of components.

In some embodiments, the storage system manager 210 uses a port selection policy to performs port selection, and uses the port selection result in connection with calculating a deployment score for the storage system (block 425).

There are several port selection policies that the storage system manager 210 may use to select a set of ports depending on the implementation, and a given embodiment may utilize multiple such policies to calculate deployment scores for sets of components.

One port selection policy may be to preferentially select a port group from a set of previously existing port groups. If the port group for the allocated workload cannot be selected from the set of existing port groups, a new port group can be created. However, creating a new port group requires additional effort which will result in a worse deployment score for the port group.

Another port selection policy is to have a utilization-based policy in which the ports of the port group are selected by looking at port utilization without regard for zoning. In a utilization-based port selection policy, the least utilized port for each director is selected until the requested port count is reached. Two ports are only selected from the same director only if all directors have already been tried or the remaining ports and directors are already over-utilized with respect to best-practice limits.

Another port selection policy is to have the storage system manager 210 implement a zoning-based port selection policy. In a zoning-based port selection policy, current zoning is used as a filter for candidate ports or port groups, and utilization is used as a secondary consideration.

Accordingly, in some embodiments, port selection is implemented in connection with calculating deployment scores to rank port groups that may be used to implement the assignment of the allocated workload. Port selection scores associated with particular storage systems are then likewise used by the storage system manager 210 to calculate deployment scores for the storage systems (block 420).

In some embodiments, the storage system manager 210 also considers initiator groups when calculating deployment scores (block 420) for the allocated workload. If no specified WWNs/IQNs exist in an initiator group on the target storage system, a new initiator group will need to be created. If all specified WWNs/IQNs exist in an initiator group on the target array, the existing initiator group can be reused. If a subset of specified WWNs/IQNs exist in an initiator group on the target array, the existing initiator group can be reused, the remaining WWNs/IQNs can be added to a new group, and the two groups can then be tied together in a parent initiator group. If any of the specified WWNs/IQNs exist in an initiator group on the target array with additional/unspecified WWNs/IQNs, a failure occurs. Accordingly, in some embodiments, the storage system manager 210 calculates a value of the deployment scores (block 420) at least in part on an amount of effort required to implement/change zoning to enable the proposed workload to be implemented on the target storage system.

As shown in FIG. 4, in some embodiments, the storage system manager 210 creates a first ranked list of candidate storage systems based on performance impact scores (block 410). The storage system manager 210 then assigns a first weighted numerical value to each candidate storage system in the first ranked list (block 415). Table I shows an example ranked list of candidate storage systems based on performance impact scores and associated weighted numerical values.

TABLE I

| Ranked List of Storage Systems based on Performance Impact scores | Ranked Weighted Performance Impact Score |
| --- | --- |
| Storage System #2 | 1.0 |
| Storage System #3 | 0.8 |
| Storage System #1 | 0.6 |
| Storage System #4 | 0.4 |
| Storage System #5 | 0.2 |

Additionally, as shown in FIG. 4, the storage system manager 210 creates a second ranked list of candidate storage systems based on deployment scores (block 425). The storage system manager 210 then assigns a second weighted numerical value to each candidate storage system in the second ranked list (block 430). The first weighting and second weighting can be based, in some embodiments, on the relative importance of performance vis-à-vis deployment, and can vary depending on the implementation. Table II shows an example ranked list of candidate storage systems based on deployment scores and associated weighted numerical values.

TABLE II

| Ranked List of Storage Systems based on Deployment Scores | Ranked Weighted Deployment Score |
|---|---|
| Storage System #1 | 1.0 |
| Storage System #5 | 0.8 |
| Storage System #4 | 0.6 |
| Storage System #2 | 0.4 |
| Storage System #3 | 0.2 |

In some embodiments, for each candidate storage system a combined numerical weighted value is determined by adding the first weighted numerical value for the storage system with the second weighted numerical value for the storage system (block 435). Where storage systems have the same combined numerical weighted value, in some embodiments the storage systems are ranked according to their performance impact scores. Table III shows an example ranked list of candidate storage systems based on combined deployment scores and associated weighted numerical values.

TABLE III

| Ranked List of Storage Systems based on Overall Scores | Overall Score |
|---|---|
| Storage System #1 | 1.6 |
| Storage System #2 | 1.4 |
| Storage System #3 | 1.0 |
| Storage System #4 | 1.0 |
| Storage System #5 | 1.0 |

In some embodiments, the storage system manager 210 selects, as the target storage system for the allocated workload, the candidate storage system with the highest combined weighted numerical value (block 440). In other embodiments, the rankings are reversed and the storage system manager selects, as the target storage system, the candidate storage system with the lowest combined weighted numerical value. As shown in this hypothetical example, the highest ranked storage system based on performance impact scores is storage system #2. The storage system that is selected to implement the allocated workload, however, is storage system #1. By considering deployment as well as performance, the storage system manager 210 is able to select a storage system to handle an allocated workload that is most capable of assuming responsibility for the workload and that will result in the best deployment when considering both deployment effort and optimal deployment placement.

Once a storage system 100 has been selected, as described herein, the storage system manager 210 is used to configure the selected storage system to implement the allocated workload. Configuration of the storage system can include, for example, creating a required port group, initiator group, implementing zoning, instantiating any necessary applications, and other such physical activity that is required to be implemented to enable the allocated workload to be executed by the selected storage system. Once configured, the selected storage system then is operated to enable the allocated workload to be executed by the selected storage system. Since storage tier placement was determined in connection with calculating performance impact scores, in some embodiments the allocated workload is automatically assigned to the previously determined storage tier on the selected storage system.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for assigning an allocated workload to a storage system in a data center having multiple storage systems, the computer program including a set of instructions which, when executed by a computer, cause the computer to perform a method comprising the steps of:

characterizing the allocated workload;

determining a target subset of storage systems from the multiple storage systems;

for each storage system of the target subset of storage systems, determining a performance impact score by simulating addition of the allocated workload to the storage system;

for each storage system of the target subset of storage systems, determining a deployment score by assessing an amount of storage system configuration required to implement the allocated workload on the storage system;

creating a first ranking of the storage systems of the target subset according to performance impact scores;

creating a second ranking of the storage systems of the target subset according to deployment scores;

creating an overall ranking of the storage systems of the target subset by combining the first ranking and second ranking; and assigning the allocated workload to the storage system having the highest overall ranking.

2. The non-transitory tangible computer readable storage medium of claim 1, wherein determining the performance impact scores for the target storage systems comprises performing a storage tier placement for the allocated workload on each target storage system.

3. The non-transitory tangible computer readable storage medium of claim 2, further comprising increasing the storage system's performance impact score if the step of performing storage tier placement results in placement of the workload in a highest performance storage tier for the storage system.

4. The non-transitory tangible computer readable storage medium of claim 2, wherein the step of assigning the allocated workload to the storage system having the highest overall ranking comprises assigning the allocated workload to a determined storage tier on the storage system having the highest overall ranking according to a result of the step of performing storage tier placement for the allocated workload.

5. The non-transitory tangible computer readable storage medium of claim 1, wherein determining the performance impact score comprises simulating the allocated workload on a set of components of the storage system, determining a simulated usage level of the component, comparing the simulated usage level to a threshold usage level for the component, and assigning a component impact score to the component based on the comparison between the simulated usage level and the threshold usage level.

6. The non-transitory tangible computer readable storage medium of claim 1, wherein determining the deployment score comprises performing port assignment for the allocated workload on the storage system, determining initiator compliance, and determining a set of directors on the storage system for the allocated workload.

7. The non-transitory tangible computer readable storage medium of claim 6, wherein determining the deployment score further comprises comparing sets of components selected to implement the allocated workload with redundancy policies.

8. The non-transitory tangible computer readable storage medium of claim 6, wherein determining the deployment score further comprises determining an amount of effort required to implement the allocated workload on the selected sets of components.

9. The non-transitory tangible computer readable storage medium of claim 8, wherein determining the amount of effort required to implement the allocated workload on the selected sets of components comprises determining an amount of zoning changes required to implement the allocated workload on the selected sets of components.

10. The non-transitory tangible computer readable storage medium of claim 8, wherein determining the amount of effort required to implement the allocated workload on the selected sets of components comprises determining whether an initiator group will need to be created to implement the allocated workload on the selected sets of components and determining if implementing the workload on the selected sets of components would violate zoning associated with one or more existing initiator groups.

11. A method of assigning an allocated workload to a storage system in a data center having multiple storage systems, comprising the steps of:

characterizing the allocated workload;

determining a target subset of storage systems from the multiple storage systems;

for each storage system of the target subset of storage systems, determining a performance impact score by simulating addition of the allocated workload to the storage system;

for each storage system of the target subset of storage systems, determining a deployment score by assessing an amount of storage system configuration required to implement the allocated workload on the storage system;

creating a first ranking of the storage systems of the target subset according to performance impact scores;

creating a second ranking of the storage systems of the target subset according to deployment scores;

creating an overall ranking of the storage systems of the target subset by combining the first ranking and second ranking; and assigning the allocated workload to the storage system having the highest overall ranking.

12. The method of claim 11, wherein determining the performance impact scores for the target storage systems comprises performing a storage tier placement for the allocated workload on each target storage system.

13. The method of claim 12, further comprising increasing the storage system's performance impact score if the step of performing storage tier placement results in placement of the workload in a highest performance storage tier for the storage system.

14. The method of claim 12, wherein the step of assigning the allocated workload to the storage system having the highest overall ranking comprises assigning the allocated workload to a determined storage tier on the storage system having the highest overall ranking according to a result of the step of performing storage tier placement for the allocated workload.

15. The method of claim 11, wherein determining the performance impact score comprises simulating the allocated workload on a set of components of the storage system, determining a simulated usage level of the component, comparing the simulated usage level to a threshold usage level for the component, and assigning a component impact score to the component based on the comparison between the simulated usage level and the threshold usage level.

16. The method of claim 11, wherein determining the deployment score comprises performing port assignment for the allocated workload on the storage system, determining initiator compliance, and determining a set of directors on the storage system for the allocated workload.

17. The method of claim 16, wherein determining the deployment score further comprises comparing sets of components selected to implement the allocated workload with redundancy policies.

18. The method of claim 16, wherein determining the deployment score further comprises determining an amount of effort required to implement the allocated workload on the selected sets of components.

19. The method of claim 18, wherein determining the amount of effort required to implement the allocated workload on the selected sets of components comprises determining an amount of zoning changes required to implement the allocated workload on the selected sets of components.

20. The method of claim 18, wherein determining the amount of effort required to implement the allocated workload on the selected sets of components comprises determining whether an initiator group will need to be created to implement the allocated workload on the selected sets of components and determining if implementing the workload on the selected sets of components would violate zoning associated with one or more existing initiator groups.

* * * * *